A. W. COPLAND.
DOUGH FEEDING MECHANISM.
APPLICATION FILED NOV. 10, 1906.
898,726.
Patented Sept. 15, 1908.
4 SHEETS—SHEET 1.
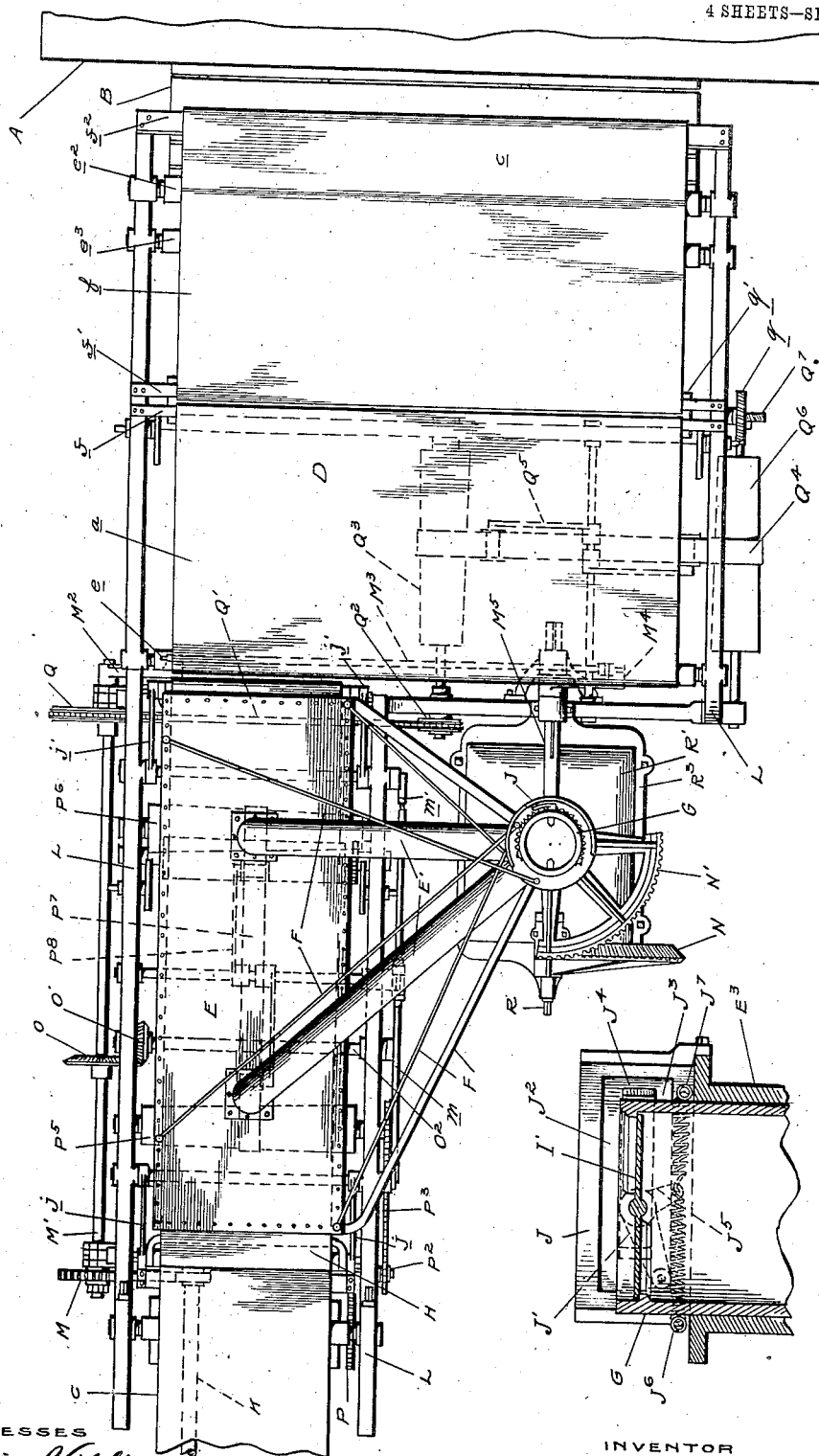
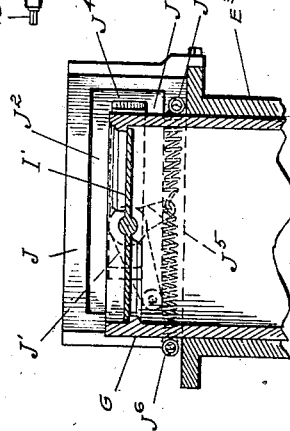
WITNESSES
INVENTOR
ALEXANDER W. COPLAND
BY
ATT'YS

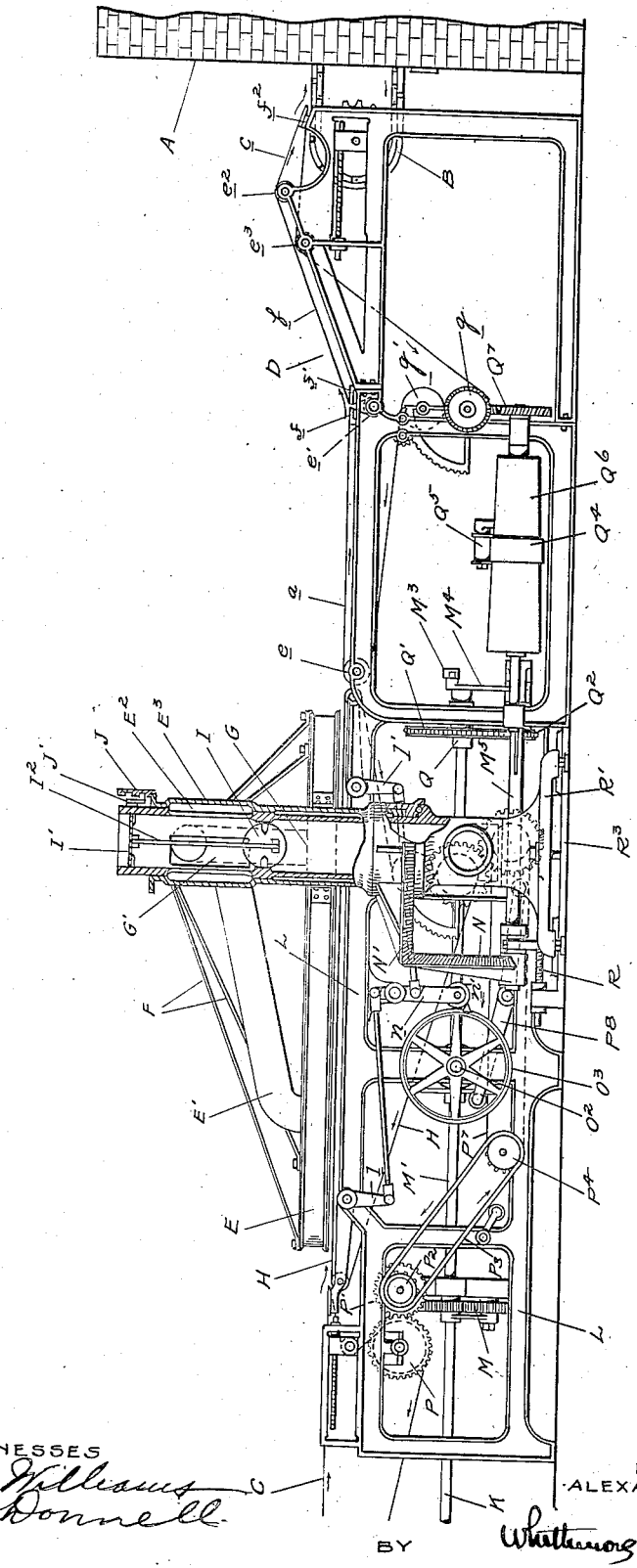

A. W. COPLAND.
DOUGH FEEDING MECHANISM.
APPLICATION FILED NOV. 10, 1906.

898,726.

Patented Sept. 15, 1908.
4 SHEETS—SHEET 3.

WITNESSES

INVENTOR
ALEXANDER W. COPLAND
BY
ATT'YS

UNITED STATES PATENT OFFICE.

ALEXANDER W. COPLAND, OF DETROIT, MICHIGAN.

DOUGH-FEEDING MECHANISM.

No. 898,726.  Specification of Letters Patent.  Patented Sept. 15, 1908.

Application filed November 10, 1906. Serial No. 342,882.

*To all whom it may concern:*

Be it known that I, ALEXANDER W. COPLAND, a citizen of the United States of America, residing at Detroit, in the county of Wayne and State of Michigan, have invented certain new and useful Improvements in Dough-Feeding Mechanism, of which the following is a specification, reference being had therein to the accompanying drawings, and upon which I have secured Letters Patent in the Kingdom of Great Britain and Ireland, dated November 15, 1905, No. 23,514.

The invention relates to apparatus for automatically handling sheet dough, and has for its primary object the automatic feeding and delivery of the dough from a cutter to an oven or series of ovens.

In the present state of the art, the width of the sheet of dough cut by the dough-cutting machines is much less than the width of the ovens in which the dough is deposited. On the other hand, the capacity of a single dough cutter is generally sufficient to supply dough for one oven or even for several ovens. Thus, it is necessary to rearrange sections of the narrow dough strip, so as to cover the entire area of the oven. In the present invention, I have accomplished this rearrangement by an exceedingly simple construction of transfer mechanism and one capable of feeding the dough from a single cutter to a plurality of ovens.

The invention therefore consists in the novel construction of this transfer mechanism, and, further, in the novel construction and arrangement of associated parts, as hereinafter set forth.

Figure 3:
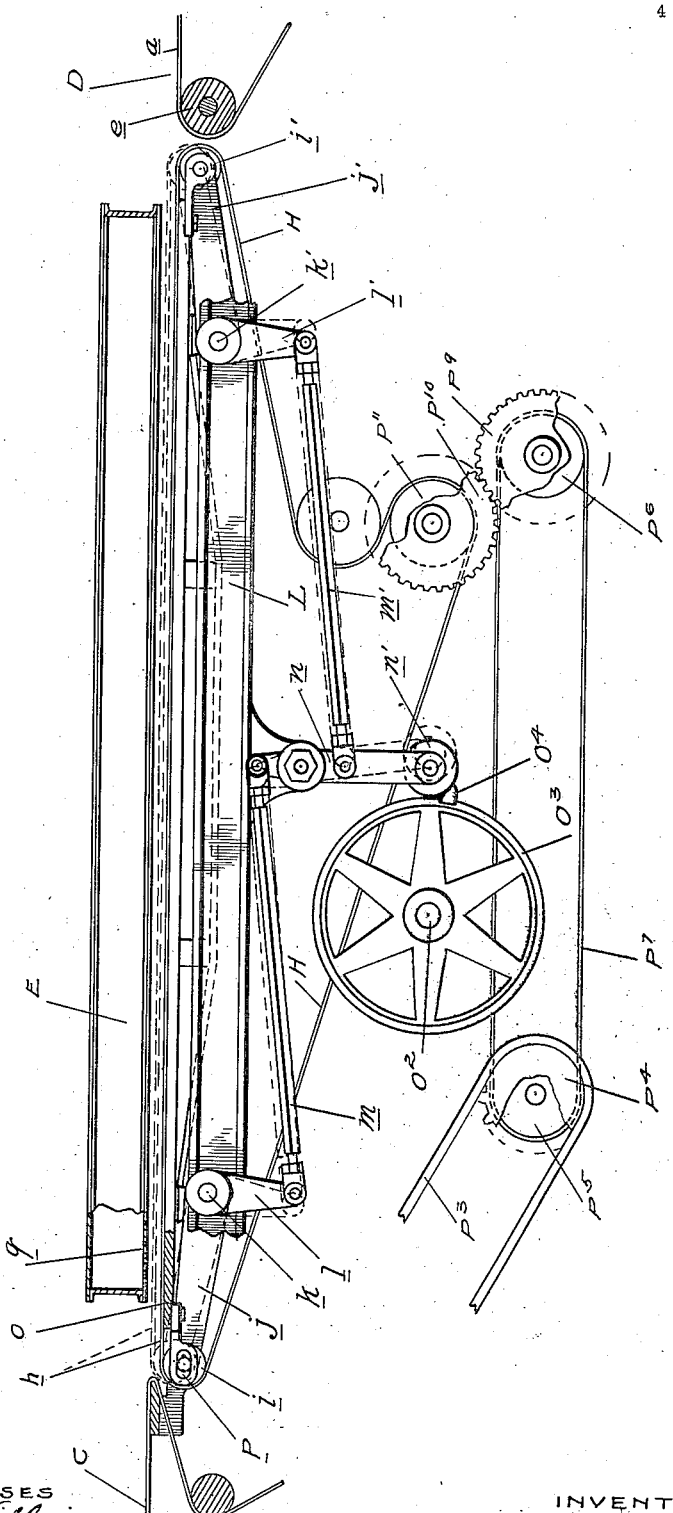
Figure 4:
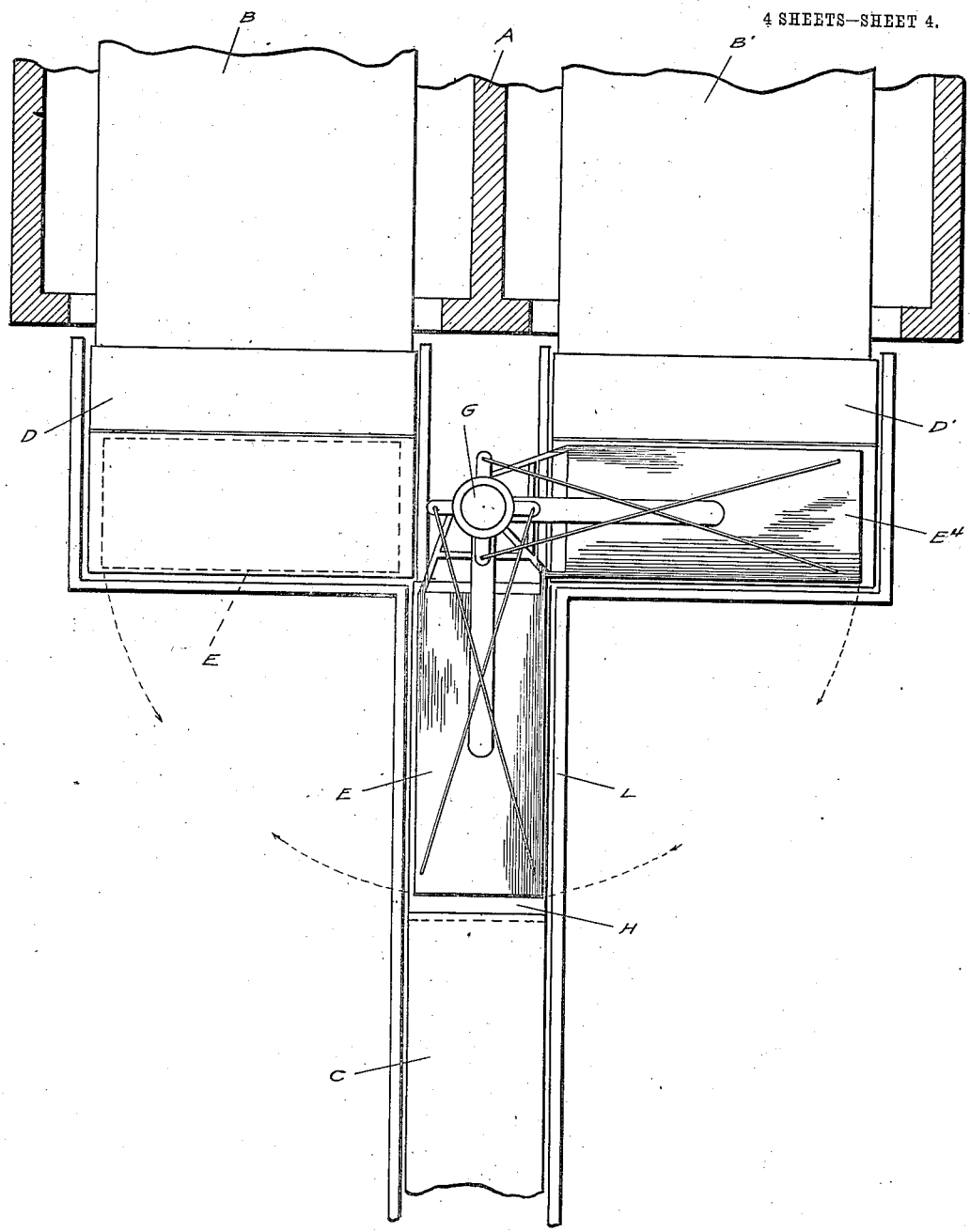

In the drawings,—Figure 1 is a plan view of an apparatus for supplying dough to a single oven; Fig. 2 is a sectional side elevation thereof; Fig. 3 is an enlarged elevation, partly in section, of the transfer mechanism; Fig. 4 is a diagrammatic plan view, illustrating the arrangement for the feeding of two ovens from a single cutter; Fig. 5 is a detail of the valve-actuating mechanism for the suction head.

The oven A to which the dough is delivered may be of any suitable construction, but, as shown, is of the chain type, i. e. an endless carrier chain B is employed for feeding the dough into and out from the oven, and for supporting it while baking. The dough cutter (not shown) may also be of any suitable construction, from which a strip of dough is constantly fed, as by an endless carrier belt C.

In its essential character, my improved construction comprises a transfer device arranged between the carriers C and B, or equivalent dough-feeding mechanism, which is adapted to remove sections of dough from the one and deposit them differently arranged upon the other. The dimensions of the dough sections thus transferred are preferably the full width of the strip from the cutter and a length of said strip equal to the full width of the oven. Thus, by depositing the transfer section, when arranged with its major dimension extending transversely of the oven or the oven-feeding carrier, and by adjusting the relative speeds of the two carriers to feed substantially equal areas in the same length of time, a continuous charging of the oven may be effected.

To adapt my improvement to standard constructions of ovens, I preferably provide an auxiliary oven-feeding carrier D, upon which the transfer sections are deposited, and by which they are delivered to the regular carrier B. This, as shown, comprises an endless feed-belt having a portion $a$ thereof which extends in a horizontal plane substantially that of the cutter carrier C, and is further provided with an upwardly-inclined portion $b$ terminating in a downwardly-inclined portion $c$ extending over the carrier B. This relative arrangement of feeding portions of the belt may be effected by passing it over suitable pulleys $e$ $e'$ $e^2$ $e^3$ and thin-edge bars $f$ $f'$ $f^2$, the latter serving to produce sharp angle bends at the ends of the sections. The belt is driven by suitable drive pulleys $g$ $g'$ driven by mechanism hereinafter described.

*Transfer.*—The preferred form of transfer mechanism comprises a suction-head arranged in a horizontal plane slightly above that of the carriers C and the horizontal portion $a$ of the carrier D, together with mechanism by which said head is periodically moved from the one carrier to the other. The suction-head E is of suitable dimensions to provide a suction area corresponding to the size of section to be transferred. It is supported by a swinging frame F, which is pivotally mounted upon a standard G so arranged that the swinging of said frame will shift the head between its two positions of rest, and will also partially rotate the dough sections carried thereby. With the arrangement illustrated in Fig. 1, the head E, in its initial position, is in exact alinement with the carrier belt C having the major dimension extending longitudinally of said belt, while in its final or depositing position the head is swung through an angle of ninety degrees, and then extends across the belt D in registration with the horizontal section a thereof.

Instead of registering the head E directly with the carrier belt C from the cutter, I may adapt my mechanism for use in connection with cutters and ovens already in position by providing an auxiliary feed-belt H, which is arranged in alinement with the belt C and forms in effect a continuation thereof. This carrier belt H, more particularly illustrated in Fig. 3, is also adapted to be periodically raised and depressed, for the purpose of lifting the dough section which is to be transferred into close proximity to the under side of the suction head. More in detail, the belt H has a horizontal section thereof $h$, which at opposite ends passes over rolls $i\ i'$. These rolls are journaled in bearings in rock arms $j\ j'$, mounted on rock shafts $k\ k'$, and actuated through the medium of rock arms $l\ l'$, links $m\ m'$, from a common actuating lever $n$, the arrangement being such that a movement of said lever will simultaneously actuate the rolls $i\ i'$, to either raise or depress the same. Intermediate the rolls $i\ i'$, the horizontal section $h$ of the belt is supported by a table $o$, which is simultaneously raised or depressed, and to this end is supported by the rock arms $j\ j'$, through the medium of the slotted brackets $p$. Thus, the entire section $h$ of the belt H will be periodically lifted, so as to contact the upper surface of the dough section supported thereon with the under surface of the suction-head.

*Suction-head.*—The suction-head E preferably comprises a hollow horizontally-extending receptacle provided on its bottom with a flat perforated plate $q$. The chamber within this head is connected by one or more suction conduits E' with an annular chamber $E^2$ formed in a sleeve $E^3$ surrounding the standard G. This standard G is also hollow to form a suction conduit, and is slotted at G' to register with the annular chamber E'. The controlling valves for the suction are also preferably located within the hollow standard G, and, as shown, are in the form of two butterfly valves I I', connected by a link $I^2$ for simultaneous operation. These valves are preferably automatically operated by the swinging of the frame F and suction conduit E, this being accomplished by a cam J on the sleeve $E^3$, which engages a crank or rock arm J' on the stem of the valve I'. The cam J, as shown in Fig. 5, has a groove therein with which the crank J engages, said slot having two parallel horizontal portions $J^2\ J^3$, connected by vertical portions $J^4$. The crank J' is further provided with a depending arm $J^5$, which is connected to oppositely-extending springs $J^6\ J^7$, attached at their ends to the sleeve $E^3$. With the construction just described, the swinging of the frame F will cause the crank J' to travel through one of the horizontal slots, and at the same time the movement of the cam J will place one of the springs $J^6\ J^7$ under tension, so that when the end of the horizontal slot is reached, the recoil of the spring will throw the crank arm through the vertical slot to the parallel horizontal slot, this movement locking the butterfly valves. Upon the reverse movement of the swinging frames, the opposite spring will be placed under tension, which will result in returning the crank arm when the end of the horizontal slot is reached. Thus, the valves will not be operated until the entire swinging movement of the suction-head is completed, and then will be automatically reversed in position, thereby either connecting the suction-head with the suction-conduit through the standard G, or opening atmospheric connection with said suction-head to permit of depositing the transferred dough section.

The swinging of the suction-head must be accurately timed to the operation of the rock-arms $j\ j'$, which lift the feed-belt H, and must also be accurately timed to the feeding of said belt H; furthermore, the feeding of the belt D must be accurately timed to this mechanism. The mechanism for accomplishing this, as shown, comprises a shaft K which extends longitudinally of the frame L upon which the parts thus far described are mounted, and this shaft K is connected with the mechanism (not shown) for driving the cutter, so as to be accurately timed therewith. The movement of the suction-head is effected through the drive connection from the shaft K, comprising a gear-train M connecting said shaft with a shaft M', which is provided with a crank arm $M^2$ connected by a rod $M^3$ with a rock-arm $M^4$ on the rock-shaft $M^5$. The shaft $M^5$ has mounted thereon a gear-segment N, which meshes with a gear segment N' on the sleeve $E^3$. Thus, every revolution of the shaft M' will cause a reciprocation in simple harmonic movement of the swinging frame P and suction-head E carried thereby.

The raising and lowering of the section $h$ of the belt H is effected through the medium of the rock-arms $j\ j'$, rock-shafts $k\ k'$, rock-arms $l\ l'$, links $m\ m'$, and levers $n$, already described, together with a drive connection from the shaft M'. The latter comprises a pair of intermeshing bevel gears O O', communicating motion from the shaft M' to the transversely-arranged shaft $O^2$. On the opposite end of this shaft is a rotary cam $O^3$, against the periphery of which a roller $n'$ on the lever $n$ bears.

$O^4$ is a lug on the rotary cam $O^3$, which at one point in the revolution of the latter bears against the roller $n'$, pressing it outward and causing the rocking of the lever $n$, which latter, through the medium of the connections described, will raise the rolls $i$ $i'$ and the table $o$ to lift the belt $h$ and the section of dough thereon into contact with the suction-head E.

The feed-belt H is driven through the medium of a gear-train, comprising a gear-wheel P on the drive-roll for the carrier-belt C, intermeshing gear P' connected with a sprocket $P^2$, chain $P^3$ and sprocket $P^4$ on the shaft of a conical roll $P^5$. $P^6$ is a reversely-arranged conical roll, said roll being connected by a belt $P^7$, and a belt-shifter $P^8$ is provided, by adjustment of which the speed of the driven roll $P^6$ may be varied. The roll $P^6$ is connected by intermeshing gears $P^9$ and $P^{10}$ with the drive-roll $P^{11}$ for the belt H. This construction of drive mechanism permits of accurately adjusting the speed of the carrier-belt H so as to exactly correspond with that of the carrier-belt C.

The carrier-belt D is driven from the shaft M' through a train comprising a sprocket Q on said shaft, connected by a chain Q' with a sprocket $Q^2$ on the shaft of a conical roll $Q^3$, said roll being connected by a belt $Q^4$, adjusted by a belt-shifter $Q^5$ with an oppositely-arranged conical roll $Q^6$. This roll is connected through the worm gear connection $Q^7$ with the shaft of the roll $g$ which drives the belt D. Thus, by suitably adjusting the belt-shifter $Q^5$, the movement of the belt D may be accurately timed and speeded to the movement of the other carrier-belts.

The construction being as described, in operation a strip of cut dough is constantly fed by the carrier C onto the carrier H, which latter feeds it beneath the suction head E as arranged in its initial position. When the proper length of strip is fed beneath the suction-head E, the section $h$ of the belt H will be raised, as has been previously described, pressing the dough section into contact or close proximity to the suction-head, and simultaneously the valves I I' are shifted, so as to place a suction on the head and cause the dough to adhere thereto. Immediately following, the frame F is swung, carrying the suction-head through a horizontal plane into a position in registration with the section $a$ of the carrier-belt D. This movement will tension the springs $J^6$ $J^7$ in the manner before described, so that at the completion of the movement, the valves I I' will be quickly reversed in position, cutting off the suction connection with the suction-head E and opening the atmospheric connection. This will permit the dough section to drop upon the carrier-belt D, by which it is fed to the carrier-belt B and by the latter into the oven.

The dwelling of the suction-head E in registration with the carrier-belt D is only momentary, being in fact the slight interval in which the crank $M^2$ is passing its dead center, and immediately thereafter the head is again returned to its initial position. During the interval in which the suction-head is thus reciprocated, the constant feeding of the belt C has delivered another section of dough upon the carrier-belt H, which, by the time the suction-head is fully returned, will be of a proper length for a second section. The reversal of the valves I I', and the simultaneous upward movement of the belt H, will engage this dough section with the suction-head, and the operation previously described will be repeated. Meanwhile, the movement of the carrier belt D, which is at much lower speed than that of the belts C and H, will have moved the dough section previously deposited, so as to provide an unoccupied space on the horizontal portion $a$ of the belt D to receive a succeeding dough section.

It is very essential that in the operation of the suction head, the division between the dough section picked up and the dough strip following should be in the line of cut, i. e. should be between adjacent rows of crackers or cakes, avoiding the partial engagement of any row. For this purpose, I provide an adjustment for the standard G upon which the suction-head E swings, and, by properly adjusting the standard, the desired registration may be accomplished. The means of adjustment shown consists of an adjusting-screw R on the frame, which bears against the base R' of the standard G, said base being slidably secured upon a base $R^3$ on the main frame. To permit of this adjustment, the rock-arm $M^4$ is splined upon the rock-shaft $M^5$, permitting of the independent longitudinal movement of the latter.

In the construction shown in Fig. 4, a modification of the mechanism is given, in which two feed-belts D D', arranged in relation to the oven-feeds B B' of two adjacent rows, are both supplied with dough from a single cutter. With this construction, the standard G is arranged between the two ovens and the two carrier belts D D', and two suction-heads E $E^4$ are supported by this standard upon a common swinging frame. These suction-heads are arranged at an angle of ninety degrees, so that when one is in registration with the feed-belt H in line with the belt C, the other will be registered with one of the feed-belts D or D'. The swinging of the frame carrying these suction-heads through an angle of ninety degrees will shift their positions, so that the one first in registration with the belt H will be registered with the opposite feed-belt D or D', while the suction-head first in registration with one of said belts will be placed in registration with the belt H. Thus, each time the swinging frame occupies a position of rest or reversal, it will simultaneously pick up one dough section by one of the suction-heads, and deposit a previously picked-up section with the other suction-head, while in the alternate movement the section deposited will be on the feed-belt of the adjacent oven. This construction necessitates some minor changes in the arrangement of the valves and their operating mechanisms, which I do not deem it necessary to further illustrate and describe.

What I claim as my invention is:

1. In a dough feeding mechanism, means for angularly moving sections of dough in the plane in which they lie to rearrange the same in relation to each other.

2. The combination with means for feeding a strip of cut dough, of means for successively transferring sections of dough by an angular movement in the plane of feed, and rearranging them in relation to each other.

3. In a dough feeding mechanism, two carriers and means for transferring sections of dough from the one to the other by an angular movement in the plane of feed.

4. In a dough feeding mechanism, two carriers having the same direction of movement and means for transferring sections of dough from the one to the other and for rearranging said sections in relation to each other.

5. In a dough feeding mechanism, two carriers having the same direction of movement, and means for transferring sections of dough from the one to the other by an angular movement in the plane of feed.

6. In a dough feeding mechanism, two carriers traveling at different speeds in the same direction, and means for transferring sections of dough from the one carrier to the other, said sections being rearranged whereby equal areas are fed in the same time by the two carriers.

7. In a dough feeding mechanism, two continuously moving carriers traveling at different speeds, and means for periodically transferring sections of dough from the one carrier to the other by a rotary movement in the plane of the feed, said sections being rearranged so that both carriers feed equal areas in the same time.

8. In a dough feeding mechanism, two carriers traveling at different speeds, and means for periodically transferring sections of dough from the one carrier to the other by a rotary movement in the plane of the feed, the longitudinal and transverse dimensions of said sections being proportional respectively to the speeds of the carriers, and being rearranged during transfer.

9. In a dough feeding mechanism, two carriers of different widths traveling at different speeds inversely proportional to their respective widths, and means for transferring rectangular sections of dough from one carrier to the other, the longitudinal and transverse dimensions of each section being proportional to the speeds of the carriers, and being reversed during transfer with respect to the direction of feed of said carriers.

10. In a dough feeding mechanism, a dough carrier, a rotary suction transfer periodically superposed in relation to said carrier, and means for causing said suction head and carrier to approach, and for producing a suction in the head during the interval in which said head is in registration with the carrier.

11. In a dough feeding mechanism, a dough carrier, a rotary suction transfer periodically superposed in relation to said carrier, means for causing said suction head and carrier to vertically approach each other while in registration, and means for causing a suction when the said parts are in proximity.

12. In a dough feeding mechanism, a suction head, a dough carrier over which said suction head is periodically superposed, and means for raising said carrier to bring the dough thereon in range of the suction.

13. In a dough feeding mechanism, two carriers and means for transferring from one carrier to the other and rearranging sections of dough comprising a suction head periodically reciprocated in a plane about said carriers between positions respectively in registration therewith, means for causing said suction head and one of the said carriers to vertically approach in relation to each other while in registration, means for causing a suction in said head while in proximity to the said carrier, and means for destroying said suction when said head is in registration with the other carrier.

In testimony whereof I affix my signature in presence of two witnesses.

ALEXANDER W. COPLAND.

Witnesses:
AMELIA WILLIAMS,
JAMES P. BARRY.